United States Patent
Purkayastha et al.

(10) Patent No.: US 8,953,494 B2
(45) Date of Patent: *Feb. 10, 2015

(54) NETCONF-ENABLED PROVISIONING IN ROLLBACK AGNOSTIC ENVIRONMENT

(71) Applicant: Juniper Networks, Inc., Sunnyvale, CA (US)

(72) Inventors: Monimoy Purkayastha, Bangalore (IN); Madhukar Mulpuri, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/717,299

(22) Filed: Dec. 17, 2012

(65) Prior Publication Data
US 2013/0194974 A1 Aug. 1, 2013

Related U.S. Application Data

(63) Continuation of application No. 12/606,624, filed on Oct. 27, 2009, now Pat. No. 8,335,171.

(60) Provisional application No. 61/246,853, filed on Sep. 29, 2009.

(51) Int. Cl.
*H04L 12/24* (2006.01)
*G06F 17/30* (2006.01)

(52) U.S. Cl.
CPC ........ *H04L 41/0806* (2013.01); *H04L 41/0856* (2013.01); *H04L 41/0863* (2013.01); *H04L 41/0213* (2013.01); *G06F 17/30289* (2013.01)
USPC ............................ 370/254; 370/352; 709/230

(58) Field of Classification Search
USPC .................. 370/255; 709/220–224, 203, 230
See application file for complete search history.

(56) References Cited

U.S. PATENT DOCUMENTS

| | | | | |
|---|---|---|---|---|
| 5,175,852 A | * | 12/1992 | Johnson et al. | 1/1 |
| 5,202,971 A | * | 4/1993 | Henson et al. | 1/1 |
| 5,848,241 A | * | 12/1998 | Misinai et al. | 709/213 |
| 5,951,697 A | * | 9/1999 | O'Donnell et al. | 714/37 |
| 6,202,089 B1 | | 3/2001 | Juster | |
| 6,529,956 B1 | * | 3/2003 | Smith et al. | 709/229 |

(Continued)

OTHER PUBLICATIONS

Co-pending U.S. Appl. No. 12/606,624, filed Oct. 27, 2009, entitled "NETCONF-Enabled Provisioning in Rollback Agnostic Environment" by Monimoy Purkayastha et al., 57 pages.

(Continued)

*Primary Examiner* — Edan Orgad
*Assistant Examiner* — Emmanuel Maglo
(74) *Attorney, Agent, or Firm* — Harrity & Harrity, LLP

(57) ABSTRACT

A method includes receiving configuration data for configuring network devices; generating remote procedure calls (RPCs) for configuring the network devices, which include provisioning and reverse provisioning RPCs, where each reverse provisioning RPC reverse provisions a particular pseudowire; providing to the network devices the provisioning RPCs; determining a success with respect to each of the provisioning RPCs, where the success indicates that all endpoints of a pseudowire have been successfully configured; providing the reverse provisioning RPCs to the network devices, when it is determined that the success has not been achieved; and storing an indication of success when it is determined that the success has been achieved with respect to the provisioning RPCs.

20 Claims, 15 Drawing Sheets

(56) References Cited

U.S. PATENT DOCUMENTS

| | | | |
|---|---|---|---|
| 6,704,737 B1 | 3/2004 | Nixon et al. | |
| 6,862,594 B1 | 3/2005 | Saulpaugh et al. | |
| 7,080,078 B1 | 7/2006 | Slaughter et al. | |
| 7,162,628 B2 | 1/2007 | Gentil et al. | |
| 7,206,805 B1* | 4/2007 | McLaughlin, Jr. | 709/203 |
| 7,233,975 B1 | 6/2007 | Gerraty et al. | |
| 7,290,056 B1* | 10/2007 | McLaughlin, Jr. | 709/230 |
| 7,650,403 B2 | 1/2010 | Koetke et al. | |
| 8,214,470 B2* | 7/2012 | Quilty | 709/221 |
| 8,335,171 B1* | 12/2012 | Purkayastha et al. | 370/254 |
| 8,458,127 B1* | 6/2013 | Lorch et al. | 707/617 |
| 8,533,717 B2* | 9/2013 | Kilian et al. | 718/100 |
| 2002/0156894 A1* | 10/2002 | Suorsa et al. | 709/226 |
| 2004/0022379 A1 | 2/2004 | Klos et al. | 379/201.01 |
| 2004/0039925 A1 | 2/2004 | McMillan et al. | |
| 2004/0226010 A1* | 11/2004 | Suorsa | 717/174 |
| 2005/0108387 A1* | 5/2005 | Li et al. | 709/224 |
| 2006/0012393 A1* | 1/2006 | Raju Datla et al. | 326/39 |
| 2006/0013217 A1* | 1/2006 | Datla et al. | 370/389 |
| 2007/0047522 A1* | 3/2007 | Jefferson et al. | 370/352 |
| 2007/0061329 A1* | 3/2007 | Moutafov | 707/10 |
| 2007/0171919 A1 | 7/2007 | Godman et al. | |
| 2007/0239793 A1 | 10/2007 | Tyrrell et al. | |
| 2007/0288934 A1* | 12/2007 | Khan et al. | 719/318 |
| 2008/0115123 A1 | 5/2008 | Kelly et al. | |
| 2009/0037718 A1* | 2/2009 | Ganesh et al. | 713/2 |
| 2009/0106549 A1* | 4/2009 | Mohamed | 713/156 |
| 2009/0106781 A1* | 4/2009 | Reed et al. | 719/330 |
| 2009/0112965 A1* | 4/2009 | Ganesh et al. | 709/201 |
| 2009/0112969 A1* | 4/2009 | Ganesh et al. | 709/202 |
| 2009/0310595 A1 | 12/2009 | Badger | |
| 2010/0049837 A1* | 2/2010 | Ji | 709/220 |
| 2010/0057930 A1 | 3/2010 | Dehaan | |
| 2010/0071040 A1 | 3/2010 | Upp et al. | |
| 2010/0218243 A1 | 8/2010 | Dehaan et al. | |
| 2010/0250907 A1 | 9/2010 | Dehaan | |

OTHER PUBLICATIONS

R. Enns et al., "Network Configuration Protocol (NETCONF)," Internet Engineering Task Force (IETF), RFC 6241—NETCONF Configuration Protocol, Jun. 2011, 113 pages.

* cited by examiner

NETCONF-ENABLED PROVISIONING IN ROLLBACK AGNOSTIC ENVIRONMENT

CROSS REFERENCE TO RELATED APPLICATIONS

This application is a continuation of U.S. application Ser. No. 12/606,624, filed Oct. 27, 2009, which claims priority under 35 U.S.C. §119 based on U.S. Provisional Application No. 61/246,853, filed Sep. 29, 2009, the disclosures of which are hereby incorporated by reference herein in their entirety.

BACKGROUND

As a network increases in its size, it is becoming increasingly a difficult task for network administrators to provision device configurations. The problem intensifies not only when the number of devices increases but also when a greater variety of devices exist. Network administrators may utilize various protocols to manage the provisioning of device configurations.

SUMMARY

According to one implementation, a method may include receiving, by a network device, configuration data for configuring one or more other network devices; generating, based on the received configuration data and by the network device, one or more remote procedure calls (RPCs) for configuring the one or more other network devices, where the one or more RPCs include one or more provisioning RPCs and one or more reverse provisioning RPCs, where each reverse provisioning RPC reverse provisions a particular pseudowire (PW) managed on one of the one or more other network devices; providing, to the one or more other network devices and by the network device, the one or more provisioning RPCs to configure the one or more other network devices; determining, by the network device, a success with respect to each of the one or more provisioning RPCs provided to the one or more other network devices, where the success indicates that all endpoints of a PW have been successfully configured; providing, by the network device, one or more of the one or more reverse provisioning RPCs to one or more of the one or more other network devices, when it is determined that the success has not been achieved with respect to one or more of the one or more provisioning RPCs; and storing, by the network device, an indication of success when it is determined that the success has been achieved with respect to one or more of the one or more provisioning RPCs.

According to another implementation, a device may include a processor to execute instructions in a memory to: receive configuration data for configuring one or more other network devices; generate one or more remote procedure calls (RPCs), based on the received configuration data, where the one or more RPCs include one or more provisioning RPCs capable of provisioning one or more pseudwires (PW)s associated with the one or more other network devices and one or more reverse provisioning RPCs capable of reverse provisioning one or more PWs associated with the one or more other network devices, where each reverse provisioning RPC is capable of reverse provisioning a particular PW managed on one of the one or more other network devices; provide the one or more provisioning RPCs to the one or more other network devices; determine a success with respect to the one or more provisioning RPCs, where the success indicates that all endpoints of a PW have been successfully configured; provide one or more of the one or more reverse provisioning RPCs to one or more of the one or more other network devices when it is determined that one or more of the one or more provisioning RPCs was unsuccessful; and store an indication of success when it is determined that the success have been achieved with respect to one or more of the one or more provisioning RPCs.

According to yet another implementation, a computer-readable medium may have stored thereon instructions, executable by at least one processor. The computer-readable medium may include one or more instructions for receiving configuration data to configure one or more network devices; one or more instructions for selecting templates to configure the one or more network devices based on the received configuration data, where the templates include scripting capability; one or more instructions for generating one or more remote procedure calls (RPCs) based on the selected templates, where the one or more RPCs include Network Configuration (NETCONF) protocol provisioning RPCs and one or more NETCONF reverse provisioning RPCs, where each NETCONF reverse provisioning RPC is capable of reverse provisioning a particular pseudowire (PW); one or more instructions for providing the one NETCONF provisioning RPCs to the one or more network devices; one or more instructions for determining a success with respect to the NETCONF provisioning RPCs, where the success indicates that all endpoints of a PW have been successfully configured; one or more instructions for providing one or more of the one or more NETCONF reverse provisioning RPCs to one or more of the one or more network devices that correspond to one or more PWs that were determined to be unsuccessfully provisioned; and one or more instructions for storing an indication of the success when one or more PWs were determined to be successfully provisioned.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
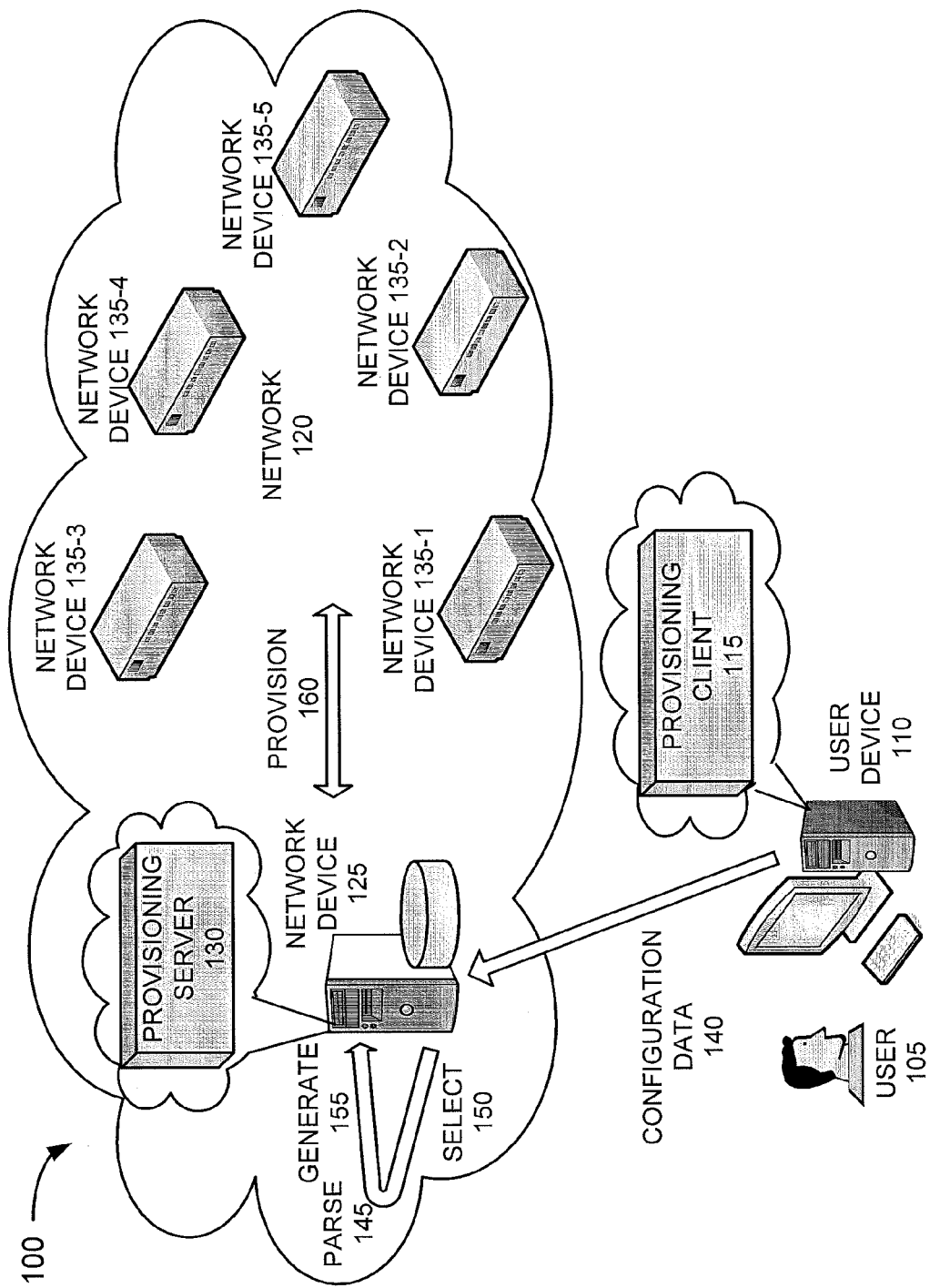
FIG. 1 is a diagram illustrating an overview of an exemplary implementation.

The following detailed description refers to the accompanying drawings. The same reference numbers in different drawings may identify the same or similar elements. Also, the following description does not limit the invention.

The Network Configuration (NETCONF) protocol is a network management protocol that provides mechanisms to install, manipulate, and delete configuration data associated with a network device. The NETCONF protocol utilizes Extensible Markup Language (XML)-based data encoding for the configuration data and operates on top of a simple Remote Procedure Call (RPC) layer. As part of the NETCONF framework, the NETCONF protocol includes a rollback-on-error operation where if an error condition occurs during an editing of configuration data on the network device, the configuration data may be restored to a state that existed prior to the editing.

While the NETCONF protocol facilitates the provisioning of configuration data, there are drawbacks. For example, there may be instances when one or more network devices in the network may be NETCONF-enabled, but these network devices may not have rollback capability. Additionally, even when a network device is NETCONF-enabled and has rollback capability, the invocation of rollback may unnecessarily waste resources and/or hinder the provisioning of configuration data. For example, when configuration data associated with two or more pseudowires (PWs) associated with the network device are updated, there may be an instance when one or more PWs are successfully provisioned on all endpoints and one or more other PWs are not successfully provisioned on all endpoints. In such an instance, the invocation of rollback will not only revert the unsuccessfully updated configuration data to its state just prior to the updating, but also revert the successfully updated configuration data to its state just prior to the updating. Thus, the rollback features of NETCONF correspond to an all or nothing approach. A PW may correspond to, for example, an emulation of a network service. The PW may be, for example, point-to-point, point-to-multi-point, multi-point-to-multi-point, etc.

Additionally, a network device may store a limited number of previous states. Thus, the rollback feature of NETCONF may be limited to restoring configuration data of the network device in correspondence to the number of previous states stored by the network device.

While implementations described herein are described in relation to the NETCONF protocol, these implementations should not be construed as dependent on employing this particular protocol. Rather, one or more implementations may be employed with respect to other device configuration-based protocols and/or other standards. Additionally, given the expansive nature of the NETCONF protocol, this description is not intended to provide an exhaustive explanation of the NETCONF protocol.

Implementations described herein may include methods, devices, and/or systems that provide a scheme to provision configurations of network devices. In some cases, one or more network devices may not have rollback capability. Additionally, even when a network device may have rollback capability (e.g., based on the NETCONF protocol), implementations described herein may provide for the reverse provisioning of portions of configuration data (e.g., associated with PWs) that may not have been successfully updated while preserving other portions of configuration data (e.g., associated with other PWs) that may have been successfully updated.

FIG. 1 is a diagram illustrating an overview of an exemplary implementation. As illustrated, an exemplary environment 100 may include a user 105, a user device 110 that includes a provisioning client 115, and a network 120. Network 120 may include a network device 125 that includes a provisioning server 130, and network devices 135-1 through 135-5 (referred to collectively as "network devices 135" or singularly as "network device 135").

The number of devices and configuration in environment 100 is exemplary and provided for simplicity. In practice, environment 100 may include more, fewer, different devices, and/or differently arranged devices than those illustrated in FIG. 1. Also, some functions described as being performed by a particular device may be performed by a different device or a combination of devices.

User 105 may correspond to a person that is responsible for configuring network devices 135, such as a network administrator. User device 110 may include a device capable of communicating with other devices, systems, networks, and/or the like. For example, user device 110 may include a portable device, a mobile device, or a stationary device, such as a computer or some other type of user terminal. Provisioning client 115 may permit user 105 to provision configuration data for network devices 135. In an exemplary implementation, provisioning client 115 may include a NETCONF provisioning client.

Network 120 may include one or more networks of any type. For example, network 120 may include a local area network (LAN), a multiprotocol label switching (MPLS)-based network, a private network, a public network, a service provider network, a wide area network (WAN), an intranet, and/or a packet-switched network.

Network device 125 may include a device capable of communicating with other devices, systems, networks, and/or the like. For example, network device 125 may include a network computer or other types of computation or communication devices. Provisioning server 130 may permit network device 125 to receive configuration data from user device 110 (e.g., provisioning client 115) and/or provision the configuration of network devices 135. In an implementation, provisioning server 130 may include a NETCONF provisioning server.

Network device 135 may include a device that is capable of communicating with other devices, systems, networks, and/or the like. For example, network device 135 may correspond to a router, a switch, a firewall, a security device, an access point, a network device that provides layer 2 and/or layer 3 functionality, or some other type of communication device that may process and/or forward network traffic. Network device 135 may be a NETCONF-enabled device.

In an exemplary process as shown in FIG. 1, user 105 may provide user device 110 (e.g., provisioning client 115) with configuration data 140, which may be sent to network device 125 (e.g., provisioning server 130). In an exemplary implementation, configuration data 140 may include an Extensible Markup Language (XML) file that contains configuration data. Provisioning server 130 may provision the configurations of network devices 135 based on configuration data 140. In one implementation, provisioning server 130 may parse 145 configuration data 140 and select 150 provisioning templates, based on configuration data 140, so that network devices 135 may be provisioned. In an implementation, the provisioning templates may include scripts or may have scripting capability for provisioning network devices 135.

Provisioning server 130 may generate 155 NETCONF provisioning RPCs and NETCONF reverse provisioning RPCs based on the provisioning templates and configuration data 140. The NETCONF provisioning RPCs may provision the configuration of network devices 135 and the NETCONF reverse provisioning RPCs may revert the configuration of network devices 135 to a state prior to their provisioning. In an exemplary implementation, provisioning server 130 may generate persistence statements (e.g., database calls) indicating that the NETCONF RPCs have been successfully generated. Provisioning server 130 may provision 160 network devices 135 based on the successfully generated NETCONF RPCs.

As will be described in greater detail below, provisioning server 130 may invoke NETCONF provisioning RPCs to network devices 135. In instances where one or more network devices 135 are unsuccessfully provisioned, provisioning server 130 may use NETCONF reverse provisioning RPCs. The NETCONF reverse provisioning RPCs may reverse provision the one or more network devices 135 whether or not these devices are NETCONF protocol devices with rollback capability. Further, when one or more of network devices 135 have rollback capability, the NETCONF reverse provisioning RPC may only reverse provision the configuration of endpoints of the one or more PWs that were unsuccessfully provisioned instead of reverse provisioning all PWs (e.g., unsuccessfully provisioned and successfully provisioned).

Since the exemplary implementation has been broadly described, variations and/or other details related to implementations described herein will be discussed further below.

EXEMPLARY DEVICE ARCHITECTURE

Figure 2A:
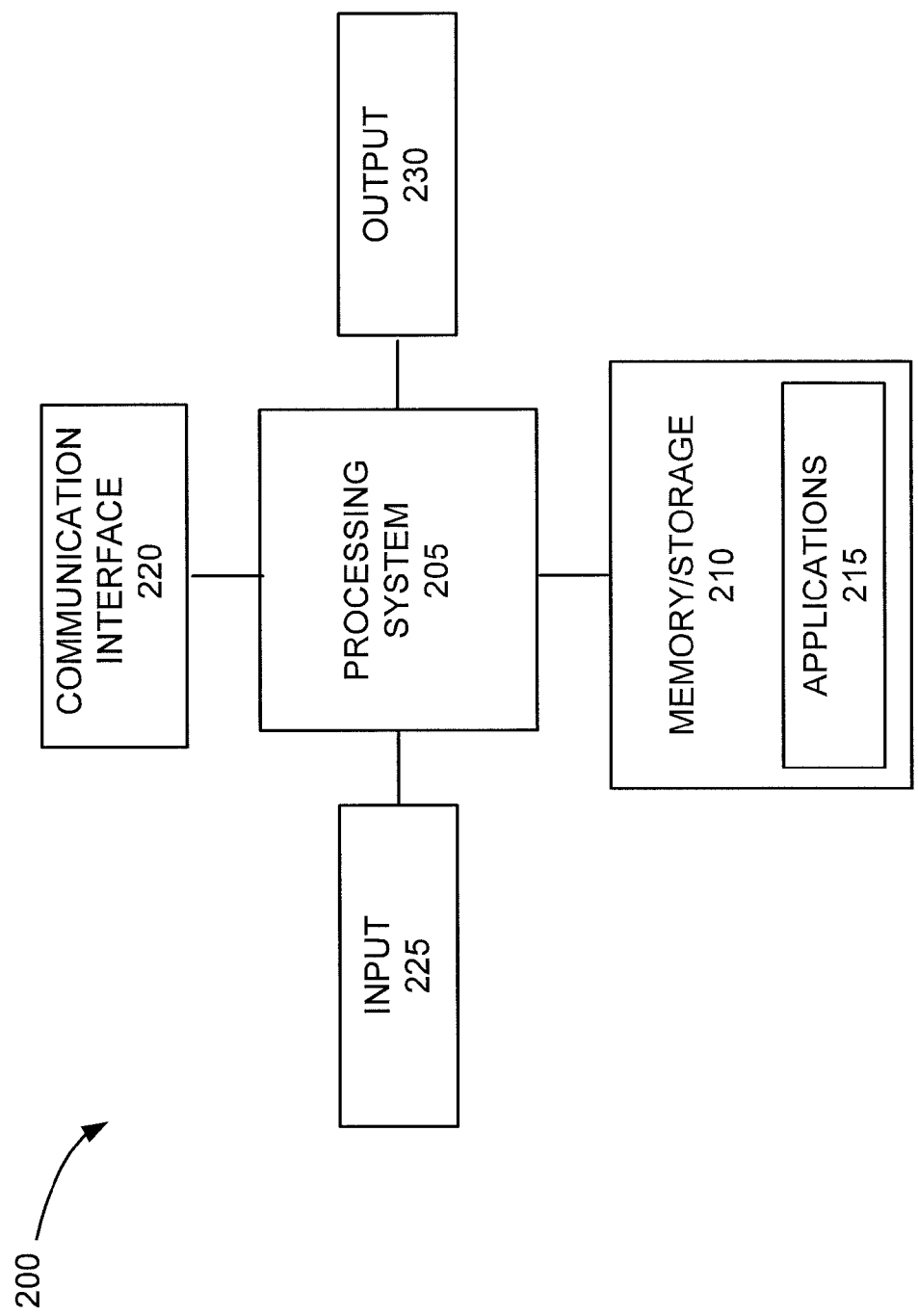
FIG. 2A is a diagram illustrating exemplary components of a device that may correspond to one or more of the devices depicted in FIG. 1.

FIG. 2A is a diagram illustrating exemplary components of a device 200 that may correspond to one or more of the devices depicted in FIG. 1. For example, device 200 may correspond to user device 110 and network device 125. As illustrated, device 200 may include a processing system 205, memory/storage 210 that includes applications 215, a communication interface 220, an input 225, and an output 230. In other implementations, device 200 may include fewer, additional, and/or different components, and/or a different arrangement of components than those illustrated in FIG. 2 and described herein. For example, device 200 may not include secondary storage (e.g., associated with memory/storage 210). Additionally, in other implementations, some functions described as being performed by a particular component of device 200 may be performed by a different component of device 200, or some combination thereof.

Processing system 205 may include one or more processors, microprocessors, data processors, co-processors, network processors, application specific integrated circuits (ASICs), application specific instruction-set processors (ASIPs), system-on-chips (SOCs), controllers, programmable logic devices (PLDs), chipsets, field programmable gate arrays (FPGAs), and/or some other component that may interpret and/or execute instructions and/or data. Processing system 205 may control the overall operation, or a portion thereof, of device 200, based on, for example, an operating system (not illustrated) and/or various applications (e.g., applications 215). Processing system 205 may access instructions from memory/storage 210, from other components of device 200, and/or from a source external to device 200 (e.g., a network, such as network 120, or another device).

Memory/storage 210 may include memory and/or secondary storage. For example, memory/storage 210 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may also include a storage device external to and/or removable from device 200, such as, for example, a Universal Serial Bus (USB) memory stick, a hard disk, etc.

The term "computer-readable medium" is intended to be broadly interpreted to include a memory, a secondary storage, or the like. A computer-readable medium may correspond to, for example, a physical memory device or a logical memory device. A logical memory device may include memory space within a single physical memory device or spread across multiple physical memory devices. The computer-readable medium may store data and/or instructions configured to implement the device configuration provisioning scheme described herein.

Memory/storage 210 may store data, application(s), and/or instructions related to the operation of device 200. For example, memory/storage 210 may include applications 215 related to providing communications within network 120. Depending on the device to which device 200 corresponds (e.g., user device 110 and/or network device 125), applications 215 may correspond to application(s) that may be included with the particular device in accordance with a communication standard, network architecture, or the like.

Communication interface 220 may permit device 200 to communicate with other devices, networks, and/or systems. Communication interface 220 may include a wireless and/or a wired interface. Communication interface 220 may also include a transceiver-like component.

Input 225 may permit a user and/or another device to input information into device 200. For example, input 225 may include a keyboard, a keypad, a mouse, a button, a switch, a knob, a touchpad, an input port, a display, voice recognition logic, and/or some other type of input component. Output 230 may permit device 200 to output information to the user and/or another device. For example, output 230 may include a display, light emitting diodes (LEDs), an output port, a speaker, and/or some other type of output component.

As described herein, device 200 may perform certain operations in response to processing system 205 executing software instructions contained in a computer-readable medium, such as memory/storage 210. The software instructions may be read into memory/storage 210 from another computer-readable medium or from another device via communication interface 220. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

Figure 2B:
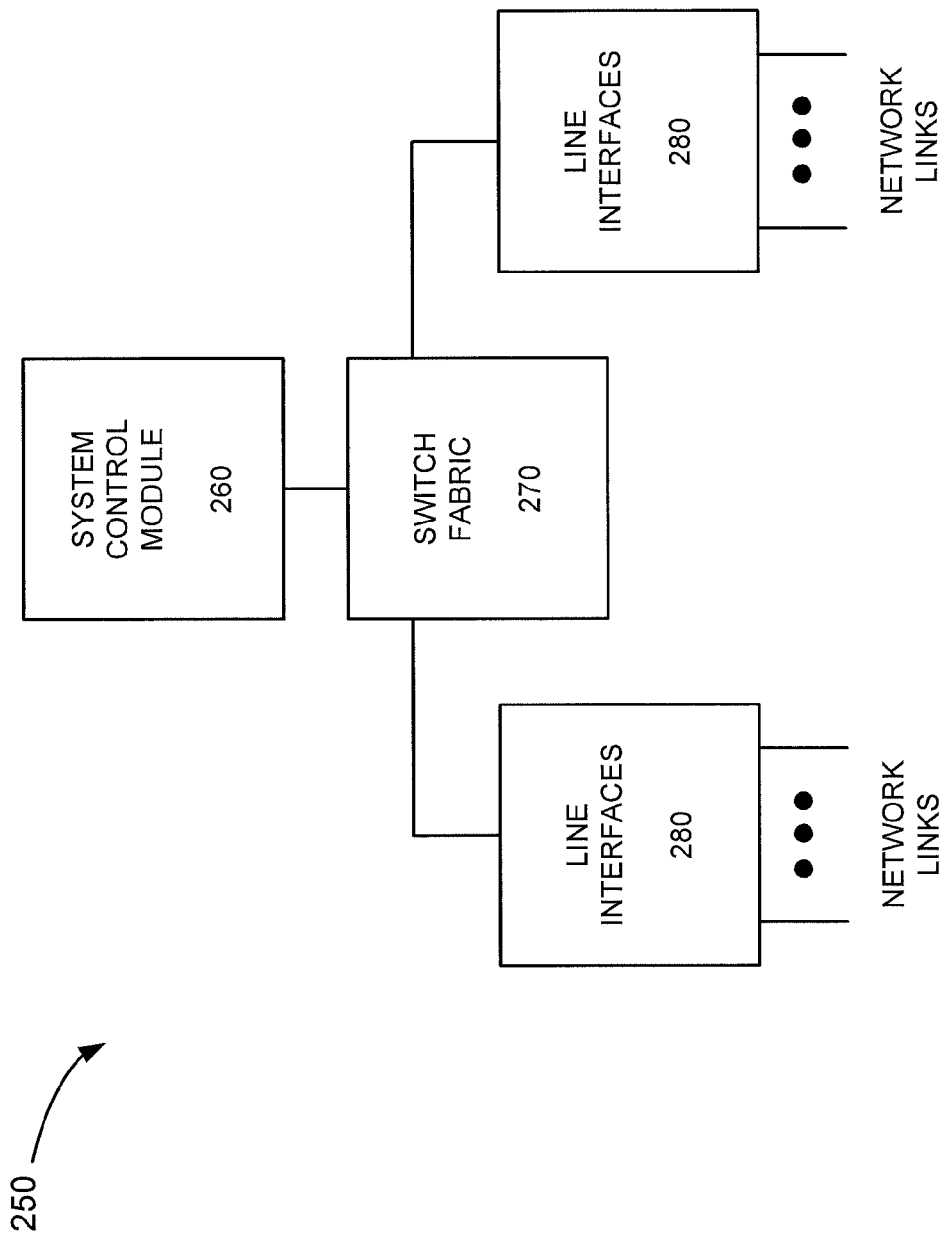
FIG. 2B is a diagram illustrating exemplary components of a device that may correspond to one or more of the devices depicted in FIG. 1.

FIG. 2B is a diagram illustrating exemplary components of a device 250 that may correspond to one or more of the devices depicted in FIG. 1. For example, device 250 may correspond to network devices 135. As illustrated in FIG. 2B, device 250 may include, for example, a system control module 260, a switch fabric 270, and a group of line interfaces 280.

System control module 260 may include one or multiple processors, microprocessors, application specific integrated circuits (ASICs), field programming gate arrays (FPGAs), and/or processing logic that may be optimized for networking and communications. System control module 260 may perform high level management functions for device 250. For example, system control module 260 may communicate with other networks, devices, and/or systems connected to device 250 to exchange information regarding network topology. In some implementations, system control module 260 may include a routing engine for creating routing tables based on network topology information, creating forwarding tables based on the routing tables, and sending these tables to line interfaces 280 for data unit routing. System control module 260 may also include a static memory (e.g. a read only memory (ROM)), a dynamic memory (e.g. a random access memory (RAM)), onboard cache, and/or flash memory for storing data and/or machine-readable instructions.

Switch fabric 270 may include one or multiple switching planes to facilitate communication among line interfaces 280 and/or system control module 260. In one implementation, each of the switching planes may include a single-stage switch or a multi-stage switch of crossbar elements. Switch fabric 270 may also, or alternatively, include processors, memories, and/or paths that permit communication among system control module 260 and line interfaces 280.

Line interfaces 280 may include devices or assemblies, such as line cards, for receiving incoming data units from network links (or from other line interfaces 280) and for transmitting the data units to network links (or to other line interfaces 280). For example, line interfaces 280 may include wireless and/or wireless interfaces, such as, Ethernet interfaces, optical carrier (OC) interfaces, and/or asynchronous transfer mode (ATM) interfaces. Line interfaces 280 may manage a set of input ports via which data units can be received and a set of output ports via which data units can be transmitted. Line interfaces 280 may include memory, one or more processors, and/or other logic.

Depending on the implementation, the components that are illustrated in FIG. 2B may provide fewer or additional functionalities. For example, if device 250 performs an Internet Protocol (IP) data unit routing function as part of a MPLS router, system control module 260 may perform tasks associated with obtaining routing information from other routers in a MPLS network. In such cases, conveying network traffic from one interface to another may involve label-based routing, rather than IP address-based routing.

Although, FIG. 2B illustrates exemplary components of device 250, in other implementations, device 250 may include additional, fewer, different components, or differently arranged components than those illustrated in FIG. 2B and described herein. Additionally, or alternatively, one or more operations described as being performed by a particular component of device 250 may be performed by one or more other components, in addition to or instead of the particular component.

Figure 3A:
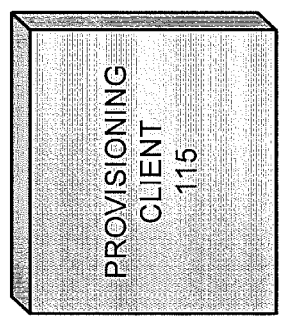
FIG. 3A is a diagram illustrating an exemplary functional component associated with a user device.

FIG. 3A is a diagram illustrating an exemplary functional component associated with user device 110. For example, as previously described, user device 110 may include provisioning client 115. Provisioning client 115 may be implemented as a combination of hardware and software based on one or more components illustrated and described with respect to FIG. 2. For example, provisioning client 115 may be implemented as a combination of processing system 205 and applications 215. Alternatively, provisioning client 115 may be implemented as hardware based on the components illustrated and described with respect to FIG. 2. Provisioning client 115 may run on an Internet browser (e.g., Internet Explorer, Firefox, Netscape Navigator, etc.).

Provisioning client 115 may permit a user (e.g., user 105) to provision the configuration of network devices 135. For example, provisioning client 115 may permit the user to enter details of PWs to be added, edited, and/or deleted. In an exemplary implementation, provisioning client 115 may generate an XML description file. In another implementation, provisioning client 115 may import an XML description file. The XML description file may contain information associated with the user's configuration of network devices 135. For example, the XML description file may include information for provisioning one or more PWs on one or more network devices 135. In an exemplary implementation, the XML description file may include various fields that may contain information for the provisioning of network devices 135. For example, the XML description file may include an operation type field, an endpoint details field, a parameters field, etc. Provisioning client 115 may allow the user to send the XML description file to network device 125.

Figure 3B:
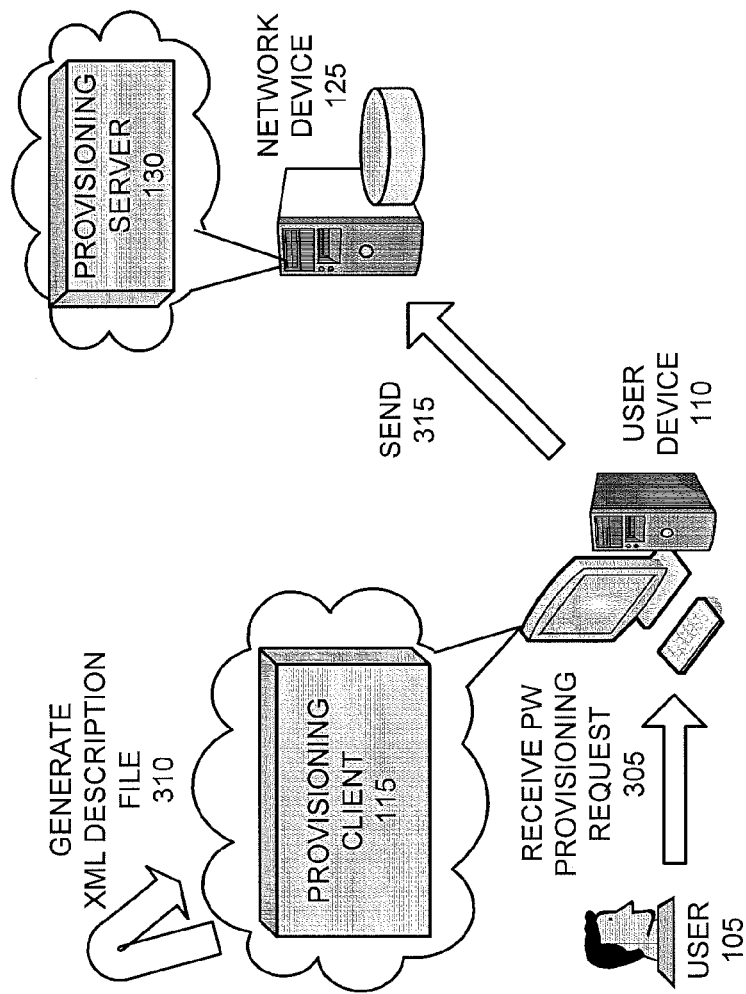
FIG. 3B is a diagram illustrating an exemplary process associated with a provisioning client.

FIG. 3B is a diagram illustrating an exemplary process associated with provisioning client 115. As illustrated, in an implementation, provisioning client 115 may receive configuration data 305 associated with network devices 135. Provisioning client 115 may generate an XML description file 310 based on the received configuration data 305. In another implementation, user 105 may import an XML description file, which may be received by provisioning client 115. Provisioning client 115 may send 315 XML description file 310 to provisioning server 130 of network device 125.

Provided below is an exemplary XML description file 310 for adding a PW between network devices 135:

```
<pws xmlns="http://juniper.net/jtk/domain>"
    <pw>
        <pw-type>l2circuit</pw-type>
        <operation-type>Add</operation-type>
        <tunnel-type>RSVP</tunnel-type>
        <interface-type>SAToP</interface-type>
        <virtual-circuit-id>1</virtual-circuit-id>
        <source-device>dev1</source-device>
        <source-ce-intf>t1-4/1/0.0</source-ce-intf>
        <source-lsp>lsp1972</source-lsp>
        <destination-device>dev2</destination-device>
        <destination-ce-intf>t1-0/0/1.0</destination-ce-intf>
        <destination-lsp>lsp1972</destination-lsp>
     <params>
        <param><name>intf_type</name>
        <value>SAToP</value></param>
         <param><name>tunnel_type</name>
         <value>RSVP</value></param>
        <param><name>payload_size</name>
        <value>1024</value></param>
        <param><name>idle_pattern</name>
        <value>0</value></param>
        </param><param><name>jitter_buffer</name>
        <value>5</value></param>
        <param><name>control_word</name>
        <value>false</value></param></source-
        params>
        </params>
    </pw>
</pws>
```

Figure 4A:
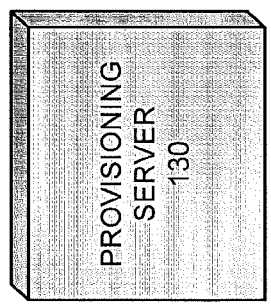
FIG. 4A is a diagram illustrating an exemplary functional component associated with a network device.

FIG. 4A is a diagram illustrating an exemplary functional component associated with network device 125. For example, as previously described, network device 125 may include provisioning server 130. Provisioning server 130 may be implemented as a combination of hardware and software based on one or more components illustrated and described with respect to FIG. 2. For example, provisioning server 130 may be implemented as a combination of processing system 205 and applications 215. Alternatively, provisioning server 130 may be implemented as hardware based on one or more components illustrated and described with respect to FIG. 2.

Provisioning server 130 may provision the configuration of network devices 135. For example, provisioning server 130 may generate NETCONF provisioning RPCs and NETCONF reverse provisioning RPCs based on configuration data received from provisioning client 115. In an exemplary implementation, configuration data may include XML description file 310.

Provisioning server 130 may utilize the NETCONF provisioning RPCs and the NETCONF reverse provisioning RPCs to provision network devices 135. For example, provisioning server 130 may push the NETCONF provisioning RPCs and/or the NETCONF reverse provisioning RPCs to network devices 135. In circumstances when portions of configuration data may be successfully provisioned and other portions of configuration data may be unsuccessfully provisioned (e.g., some PWs are successfully provisioned and other PWs are unsuccessfully provisioned on a particular network device 135), provisioning server 130 may rollback the unsuccessfully provisioned configuration data to a previous state, while preserving the successfully provisioned configuration data.

As will be described, in an implementation, provisioning server 130 may provision network devices 135 in a fully atomic manner, where, if all network devices 135 are not successfully provisioned, provisioning server 130 may reverse provision all network devices 135. In another implementation, provisioning server 130 may provision network devices 135 in a partially atomic manner, where, if one or more network devices 135 are not successfully provisioned, only the unsuccessfully provisioned network devices 135 may be reversed provisioned, while the successfully provisioned network devices 135 may be preserved. Further, provisioning server 130 may provide for numerous iterations of reverse provisioning to permit a rollback to any historical configuration state prior to numerous provisioning on network device 135.

Figure 4B:
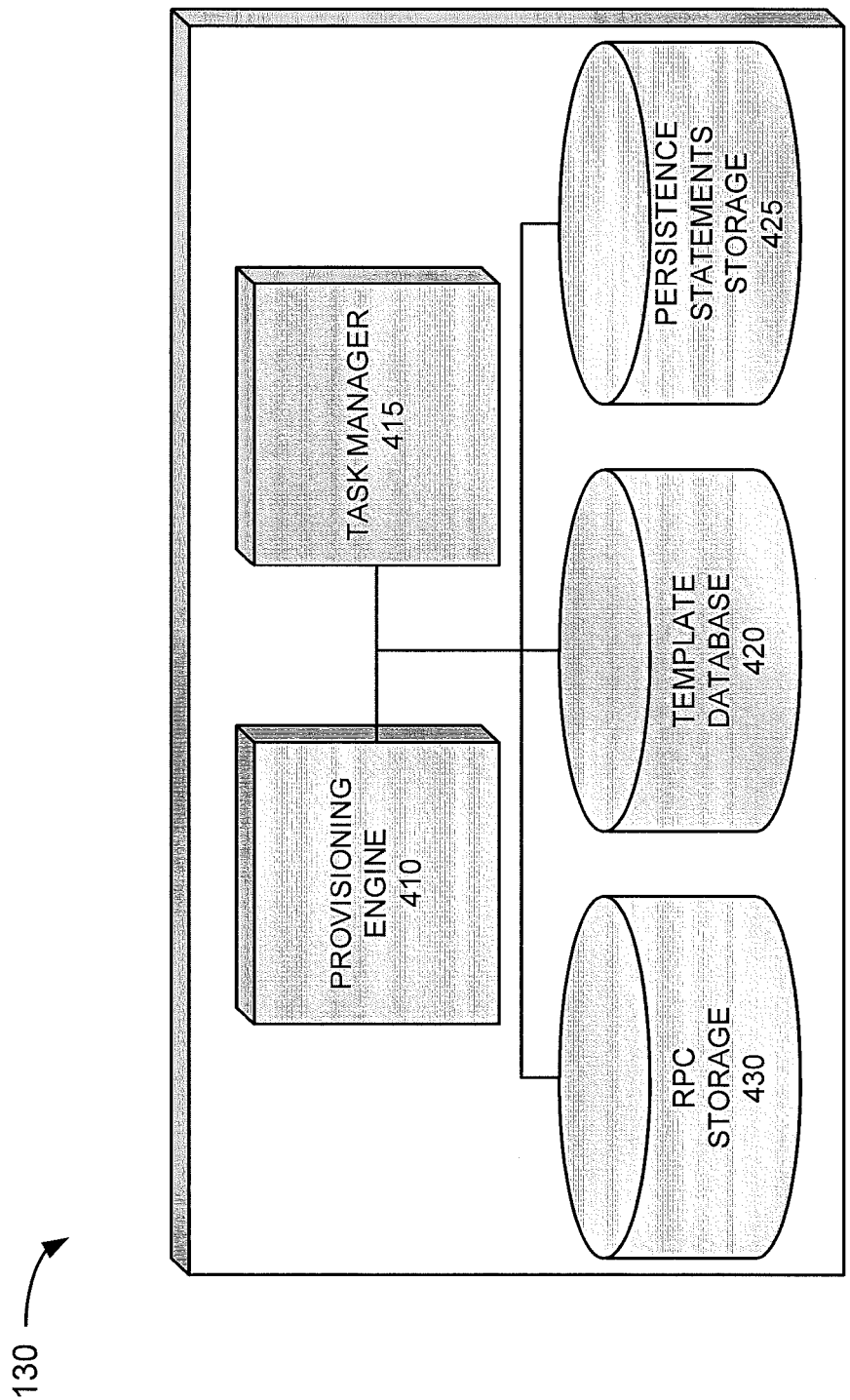
FIG. 4B is a diagram illustrating an exemplary implementation of a provisioning server.

In one exemplary implementation, provisioning server 130 may include a provisioning engine 410, a task manager 415, a template database 420, persistence statements storage 425, and RPC storage 430, as illustrated in FIG. 4B. In other implementations, provisioning server 130 may include additional, fewer, and/or different functional components, and/or a different arrangement of functional components than the functional components illustrated in FIG. 4B. Additionally, or alternatively, in other implementations, one or more functions described with respect to provisioning server 130 may be implemented wholly or partially in another device associated with network 120. Additionally, or alternatively, in other implementations, one or more functions described with respect to a functional component of provisioning server 130 may be implemented wholly or partially in another functional component of provisioning server 130. Additionally, or alternatively, provisioning server 130 may reside in more than one network device 125 (e.g., in a distributed fashion).

Provisioning engine 410 may generate NETCONF provisioning RPCs and NETCONF reverse provisioning RPCs. Provisioning engine 410 may generate NETCONF provisioning RPCs and NETCONF reverse provisioning RPCs based on configuration data 140 (e.g., XML description file 310). Provisioning engine 410 may select templates from template database 420 based on configuration data 140 (e.g., based on PW operation type, network device 135 type, etc.). Provisioning engine 410 may generate and store the NETCONF RPCs in RPC storage 430. Provisioning engine 410 may also store persistence statements (e.g., database calls) in persistence statements storage 425 which will be executed only after PWs are successfully provisioned on network devices 135. Provisioning engine 410 may invoke task manager 415 to schedule a task to provision network devices 135 based on the NETCONF RPCs followed by executing persistence statements.

Task manager 415 may provision network devices 135 based on the NETCONF RPCs and persistence statements. Task manager 415 may schedule the provisioning and may manage successful and unsuccessful provisioning based on a fully atomic or a partially atomic approach. As will be described in greater detail below, in an implementation, task manager 415 may issue, for example, LOCK, UNLOCK, EDIT-CONFIG, and COMMIT RPC commands to network devices 135 according to the NETCONF protocol, during a provisioning process. Task manager 415 may generate reports indicating the success or failure of provisioning with respect to network devices 135.

Template database 420 may store templates in which NETCONF RPCs may be generated. These templates may have scripting capability. In an exemplary implementation, a set of templates for each PW operation may be defined for a particular network device type. For example, for a type of network device 135 (e.g., a type 1, a type 2, or some other categorization), there may be templates to add, delete, or edit. Templates may be written in various languages (e.g., XML, XSL, scripting languages, etc.).

Provided below are exemplary templates (written in XML) which may be stored in template database 420:

Value Replacement Construct:

```
<interface>
    <name>%local_ce_intf</name>
</interface>
%local_ce_intf may be a value holder which may be replaced
by actual value.
```

Conditionals (e.g., if, Else, Etc.) Construct:

```
<satop-options>
   <@payload_size > 0>
        <payload-size>%payload_size</payload-size>
   </@payload_size>
</satop-options>
(If payload_size is greater than 0, then <pay-load-size> will be used).
```

Looping Construct:

```
<protocols>
    <ospf>
      <traffic-engineering>
      </traffic-engineering>
      <area>
        <name>%area</name>
        <#intf_list>
         <interface>
            <name>%intf_list</name>
         </interface>
        </#intList>
</protocols>
Here #intf_list may contain a number of interfaces on which
iterations may be performed.
```

Functional Construct:

```
<@jitter_buffer > 0>
    <jitter-buffer-latency>$multiply(%jitter_buffer, 1000)
</jitter-buffer-latency></@jitter_buffer>
(If parameter jitter_buffer value is greater than 0, then use the function
multiply to multiply the jitter_buffer value by 1000)
```

Persistence statements storage 425 may include persistence statements (e.g., database calls) that will be executed when network devices 135 have been successfully provisioned (i.e., whether the NETCONF RPCs have been successfully generated for each network device 135). Provisioning engine 410 or task manager 415 may execute the persistence statements when success responses from COMMIT RPC commands are received.

RPC storage 430 may store the generated NETCONF RPCs, such as NETCONF provisioning RPCs and NETCONF reverse provisioning RPCs, associated with each network device 135.

Figure 4C:
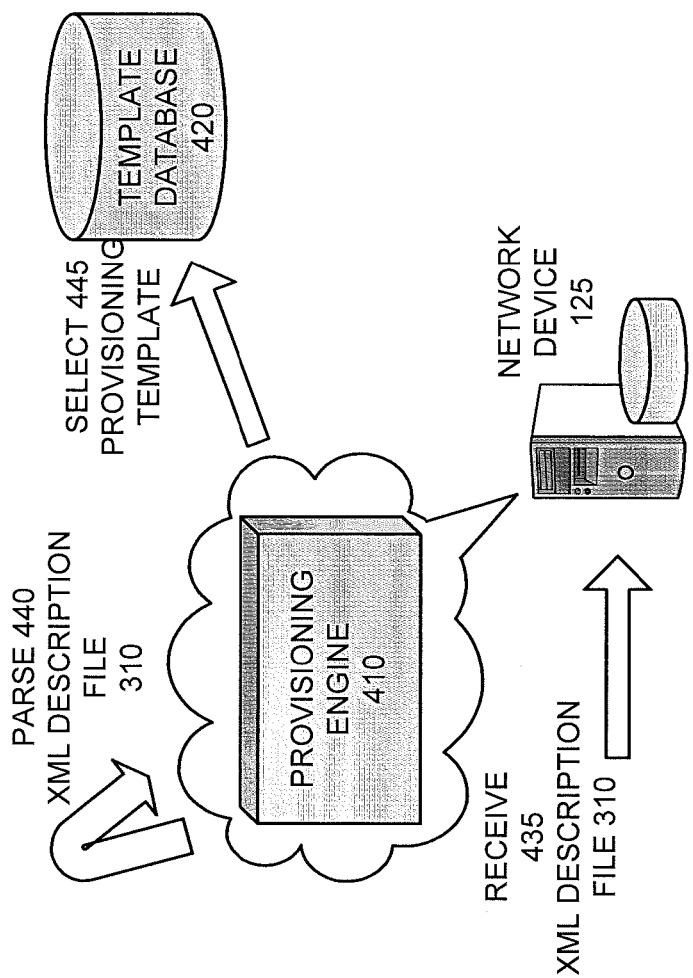
FIGS. 4C-4E are diagrams illustrating exemplary processes associated with the provisioning server.
Figure 4D:
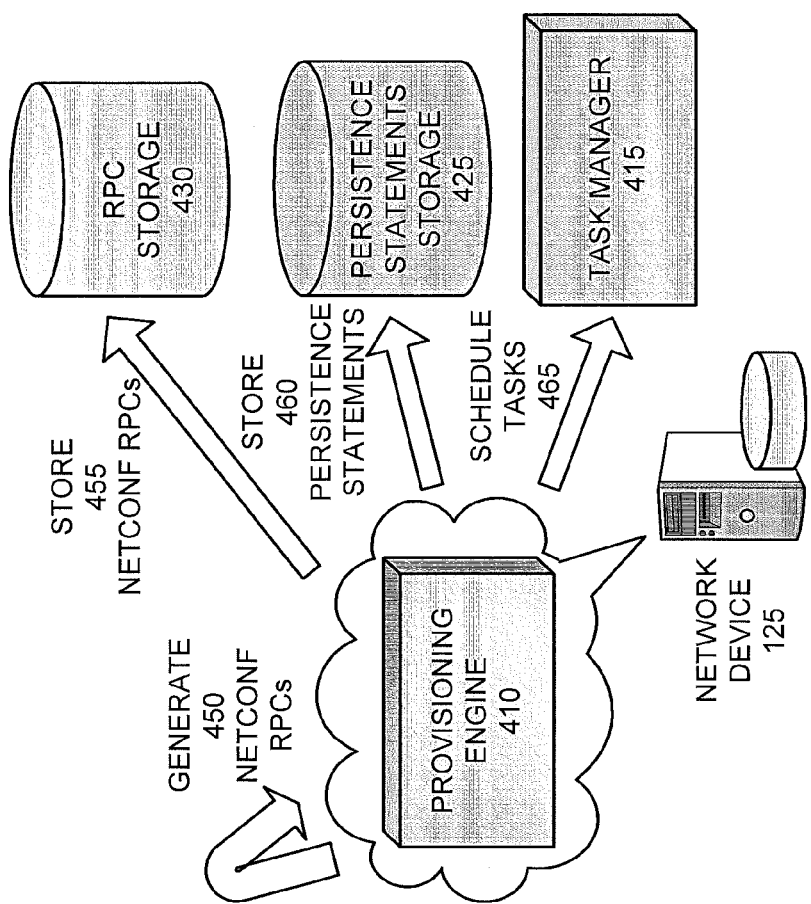
Figure 4E:
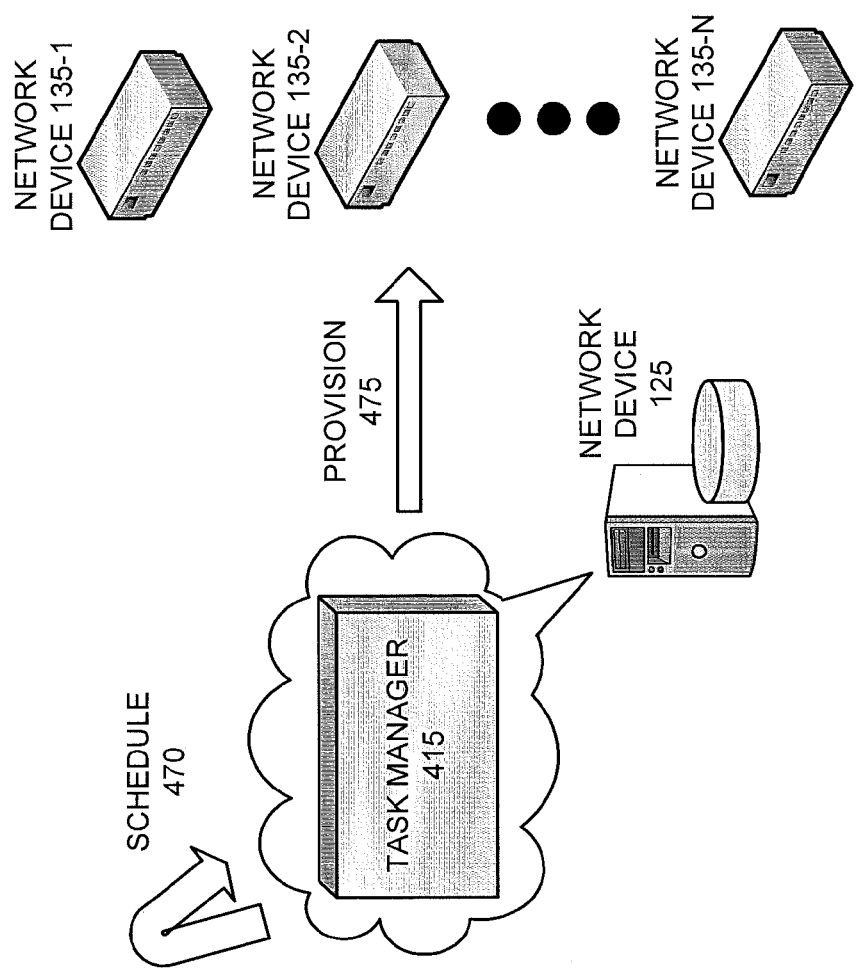

FIGS. 4C-4E are diagrams illustrating exemplary processes associated with provisioning server 130. Referring to FIG. 4C, in an implementation, provisioning engine 410 may receive 435 XML description file 310 from provisioning client 110. Provisioning engine 410 may parse 440 XML description file 310 for all network devices 135 (e.g., PWs) to be provisioned. For each PW specified in XML description file 310, provisioning engine 410 may select 445 the appropriate provisioning templates from template database 420. In an implementation, provisioning engine 410 may select 445 the appropriate provisioning templates based on a PW operation type (e.g., add, edit, etc.), type of network device 135, and/or other types of provisioning parameters that may be specified in XML description file 310 or information associated with the PW to be provisioned. Referring to FIG. 4D, provisioning engine 410 may generate 450 NETCONF RPCs (e.g., NETCONF provisioning RPCs and NETCONF reverse provisioning RPCs) for each network device 135 (e.g., PW(s)) that are to be provisioned. As further illustrated in FIG. 4D, provisioning engine 410 may store 455 the NETCONF RPCs in RPC storage 430, store 460 persistence statements in persistence statements storage 425, and schedule tasks 465 with task manager 415 to provision network devices 135.

As illustrated in FIG. 4E, task manager 415 may schedule 470 tasks to provision network devices 135 and provision 475 network devices 135 based on the scheduled tasks. Task manager 415 may provision network devices 135 in a fully atomic or partially atomic manner, as will be described in greater detail below.

Although FIGS. 4C-4E illustrate exemplary operations associated with configuration provisioning of network devices 135 by provisioning server 130, in other implementations, different, additional, and/or fewer operations may be performed.

Figure 5A:
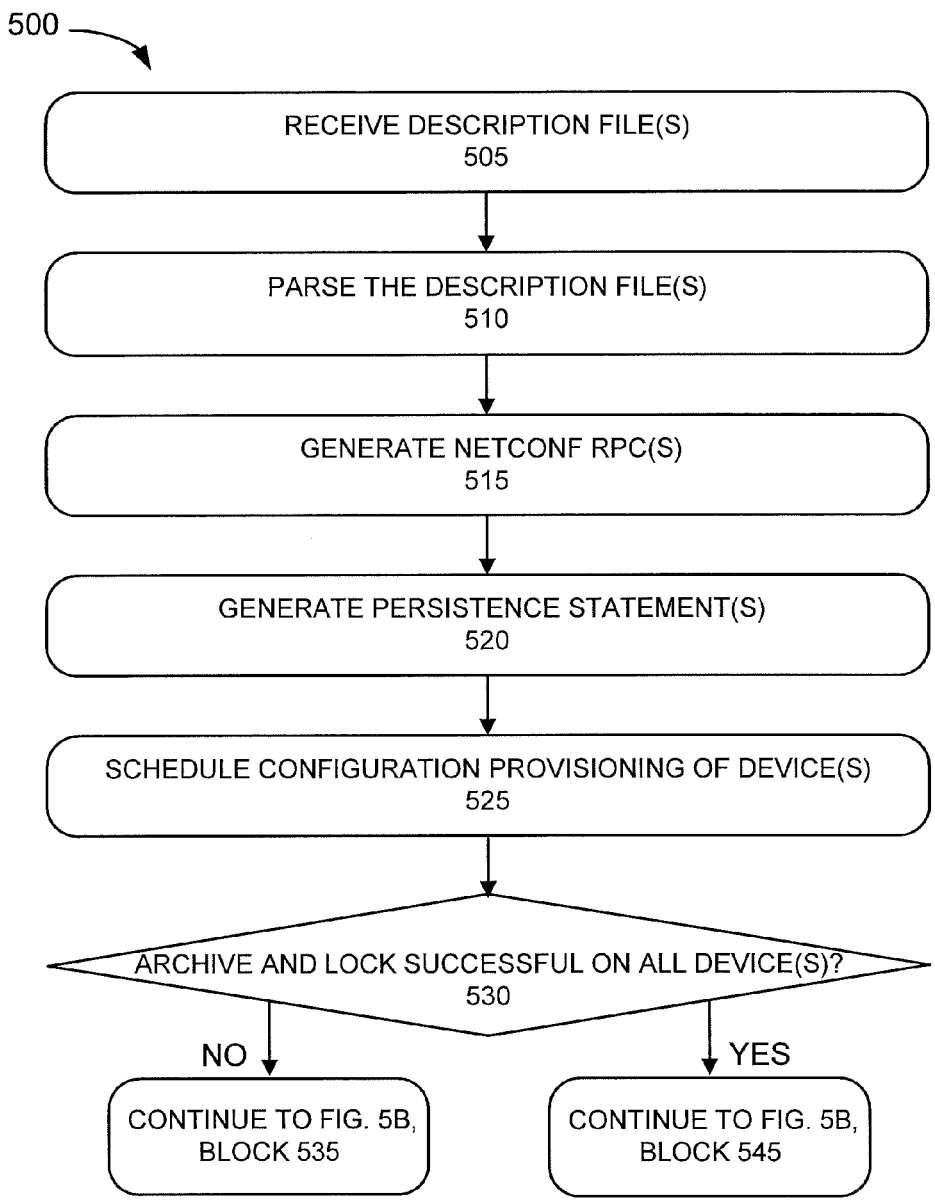
FIGS. 5A-5B are flow diagrams illustrating an exemplary process for provisioning device configurations in a fully atomic manner.
Figure 5B:
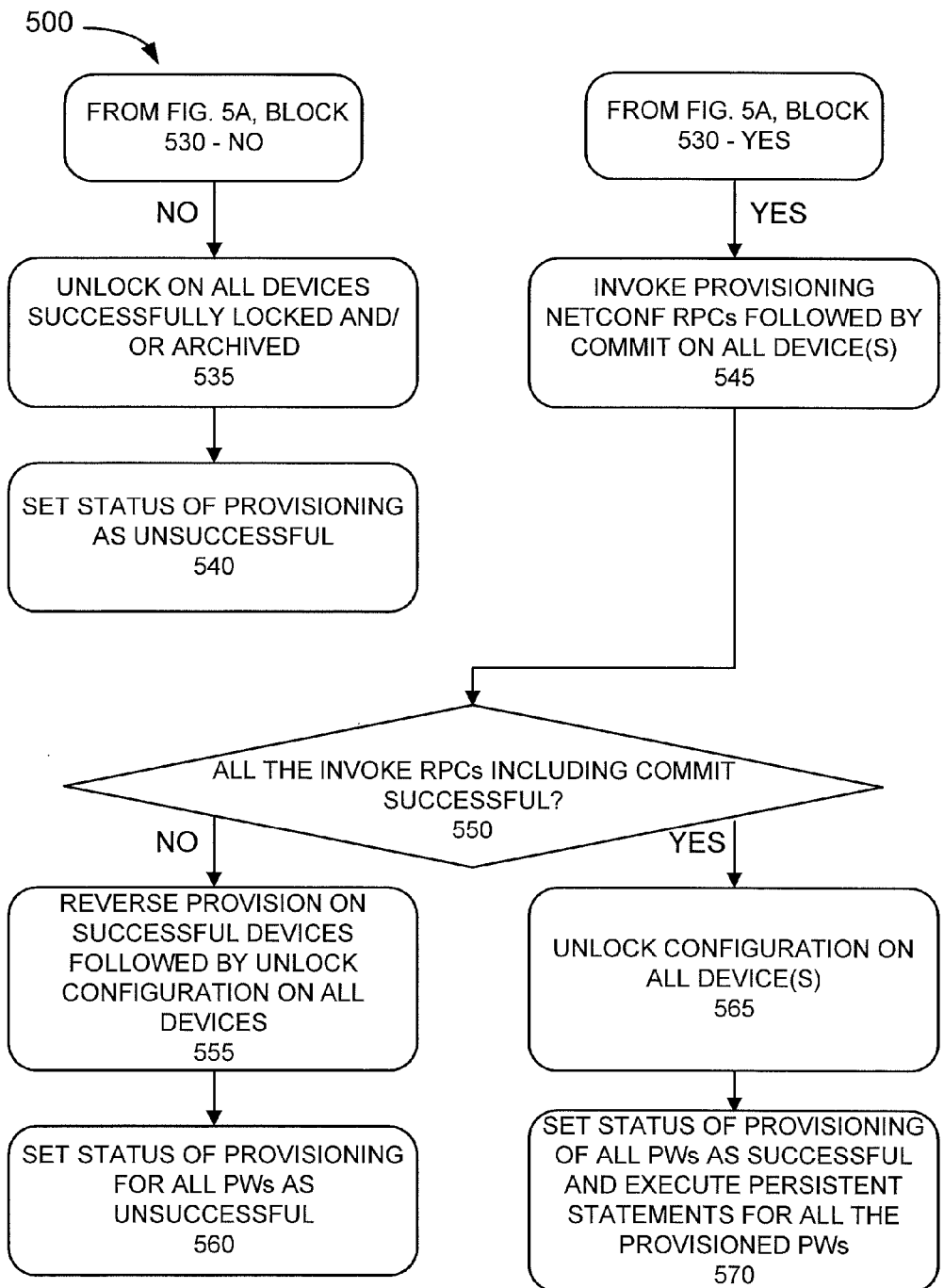

FIGS. 5A and 5B are flow diagrams illustrating an exemplary process 500 for configuration provisioning of network devices 135. In an implementation, process 500 may be performed by provisioning server 130. Process 500 may correspond to a fully atomic provisioning approach.

Process 500 may include receiving description file(s) (block 505). For example, provisioning engine 410 may receive configuration data 140 (e.g., XML description file 310) from provisioning client 110.

The description file(s) may be parsed (block 510). For example, provisioning engine 410 may parse configuration data 140 (e.g., XML description file 310) to select the appropriate provisioning template(s) from template database 420. As previously described, in an implementation, provisioning engine 410 may select the appropriate provisioning template(s) based on the PW operation type (e.g., add, edit, etc.), type of network device 135, and/or other types of provisioning parameters that may be specified in XML description file 310 or information associated with the PW to be provisioned.

NETCONF RPC(s) may be generated (block 515). For example, provisioning engine 410 may generate NETCONF provisioning RPCs and NETCONF reverse provisioning RPCs for each network device 135 (e.g. PWs) to be provisioned. Provisioning engine 410 may store the generated NETCONF RPCs in RPC storage 430.

Persistence statement(s) may be generated (block 520). For example, provisioning engine 410 may generate and store persistence statements (e.g., database calls) in persistence statements storage 425. The persistence statement(s) may, when executed, indicate that network devices 135 have been successfully provisioned. Provisioning engine 410 or task manager 415 may execute persistence statement(s) when responses from NETCONF provisioning RPCs and the following COMMIT RPC commands are received from network devices 135 indicating that PW(s) have been successfully committed on all endpoints of the PW(s). Provisioning engine 410 may indicate to task manager 415 to provision network devices 135.

The configuration provisioning of device(s) may be scheduled (block 525). For example, task manager 415 may schedule a task to archive configuration data associated with network devices 135 to be provisioned. Additionally, task manager 415 may schedule a task to issue a LOCK command to network devices 135. The NETCONF protocol provides a LOCK command that allows a client to lock a configuration of a device. Task manager 415 may attempt to LOCK and archive configuration data with respect to network devices 135 to be provisioned.

It may be determined whether the archiving and locking of all devices was successful (block 530). Task manager 415 may determine whether the archiving and locking of all network devices 135 was successful. For example, task manager 415 may determine whether a lock was successful based on a response from network device 135.

If the archiving and locking of all devices to be provisioned was not successful (block 530—NO), all devices may be unlocked (block 535), as illustrated in FIG. 5B. For example, task manager 415 may schedule a task(s) to unlock the successfully locked network devices 135. Task manager 415 may issue UNLOCK commands. In one example, task manager 415 may be configured to make more than one attempt (e.g., x number of attempts) to unlock the configuration data if for some reason responses from network devices 135 are not received within a predefined interval.

Status of provisioning may be set as unsuccessful (block 540). For example, task manager 415 may set the task for provisioning as being unsuccessful and generate a report indicating that provisioning was unsuccessful. Task manager 415 may generate a report that indicates locking was unsuccessful with respect to network devices 135 that were unsuccessfully locked. The report may also indicate whether unlocking was unsuccessful with respect to network devices 135 that were successfully locked and/or archived.

If the archiving and locking of all devices to be provisioned was successful (block 530—YES), NETCONF provisioning RPCs may be invoked on all devices followed by COMMIT on all devices (block 545), as illustrated in FIG. 5B. For example, task manager 415 may push the NETCONF provisioning RPCs to all network devices 135 followed by a single COMMIT RPC command to each network device 135. As provided in the NETCONF protocol, the COMMIT RPC command instructs network device 135 to commit the provisioned configuration data. In general, for each network device 135, NETCONF provisioning RPCs may include a list of EDIT-CONFIG commands.

It may be determined whether all of the RPCs have been successfully provisioned (block 550). For example, task manager 415 may recognize whether the NETCONF provisioning RPCs invoked on devices were successfully provisioned (including the COMMIT RPC commands) on all of network devices 135 (e.g., based on responses from network devices 135).

If it is determined that all of the RPCs have not been successfully provisioned (block 550—NO), reverse provisioning RPCs may be used on all successful devices followed by UNLOCK on all devices (block 555). For example, task manager 415 may schedule a task to reverse provision the NETCONF RPCs successfully provisioned on network devices 135. Task manager 415 may invoke appropriate NETCONF reverse provisioning RPCs on appropriate network devices 135. Task manager 415 may issue COMMIT RPC commands to commit the NETCONF reverse provisioning RPCs invoked on network devices 135. Task manager 415 may also issue UNLOCK commands. In an implementation, when an UNLOCK command and/or a reverse provisioning attempt is/are unsuccessful, task manager 415 may be configured to make more than one attempt (e.g., x number of attempts). If task manager 415 is still unsuccessful after x number of attempts, task manager 415 may continue to block 560. It will be appreciated, however, since the configuration data associated with network devices 135 has been archived, network devices 135 (e.g., network devices 135 in which NETCONF reverse provisioning RPCs were unsuccessful) may be restored to their previous configuration state (e.g., manually by user 105). In instances that task manager 415 is successful in reverse provisioning and unlocking, etc., process 500 may continue to block 560.

Status of provisioning may be set as unsuccessful (block 560). For example, task manager 415 may set the task for provisioning as being unsuccessful and generate a report indicating that provisioning was unsuccessful. For example, task manager 415 may generate a report that specifies the success and/or failure with respect to each network device 135 as it relates to NETCONF provisioning RPCs, NETCONF reverse provisioning RPCs, unlocking, committing, etc.

If it is determined that all of the RPCs (including the COMMIT RPC commands) have been successfully provisioned (block 550—YES), all devices may be unlocked (block 565). Task manager 415 may issue an UNLOCK command to each network device 135, which releases the configuration lock provided by the LOCK command. In one example, in instances when UNLOCK commands are unsuccessful, task manager 415 may make x attempts before generating a report that indicates the provisioning as unsuccessful. For example, the report may specify the success and/or failure with respect to each network device 135 as it relates to unlocking. In the instance that task manager 415 successfully unlocks network devices 135, process 500 may continue to block 570.

Status of provisioning of all PWs may be set as successful and persistent statements for all the provisioned PWs may be executed (block 570). For example, task manager 415 may set the task for provisioning as being successful when UNLOCK commands are successful. Task manager 415 may execute the persistence statements for all PWs since all PWs have been successfully provisioned. Task manager 415 may generate a report that indicates provisioning was successful for all network devices 135.

Although FIGS. 5A and 5B illustrate exemplary process 500, in other implementations, process 500 may include additional, fewer, and/or different operations than those described and illustrated in FIGS. 5A and 5B.

Figure 6A:
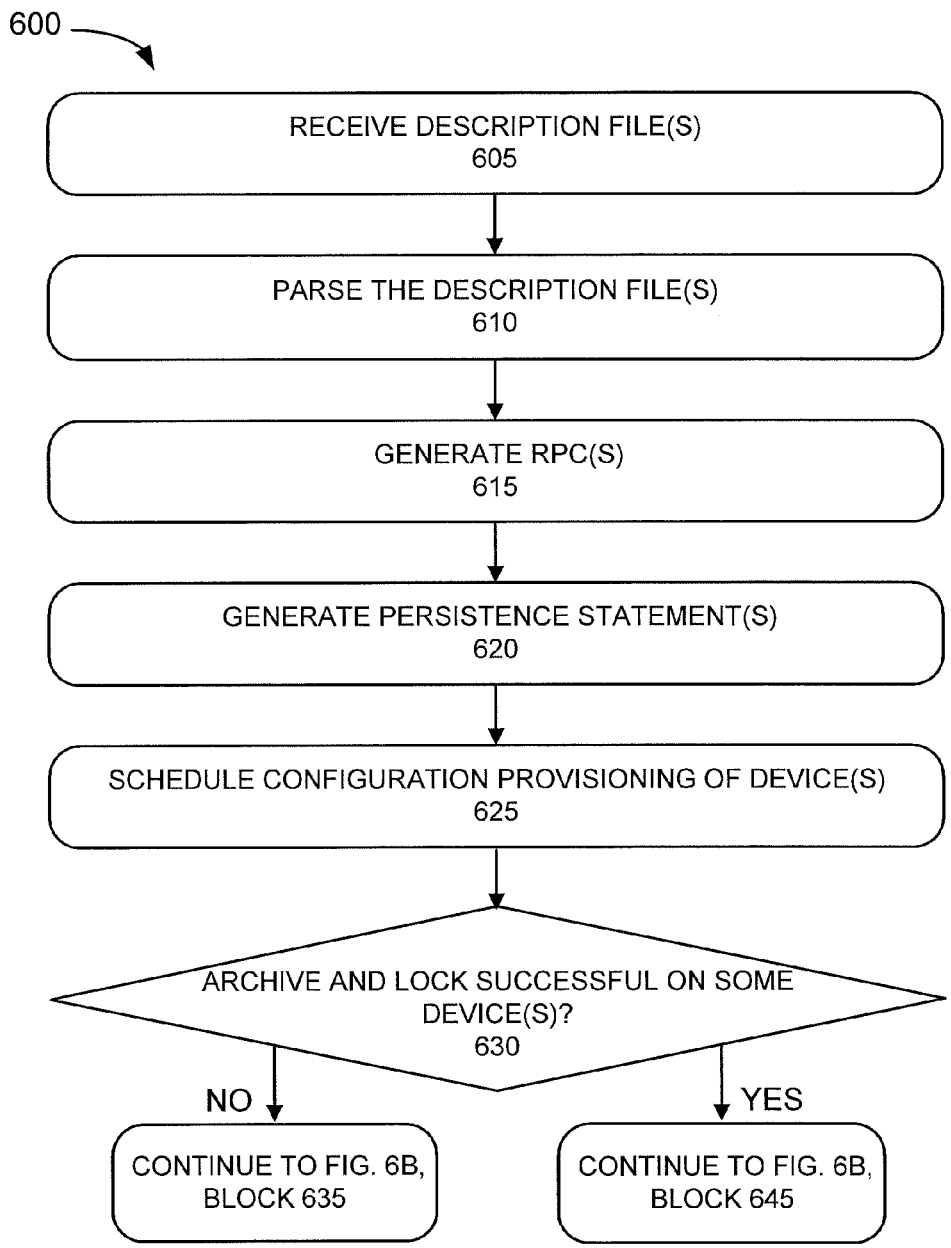
FIGS. 6A-6B are flow diagrams illustrating another exemplary process for provisioning device configurations in a partially atomic manner.
Figure 6B:
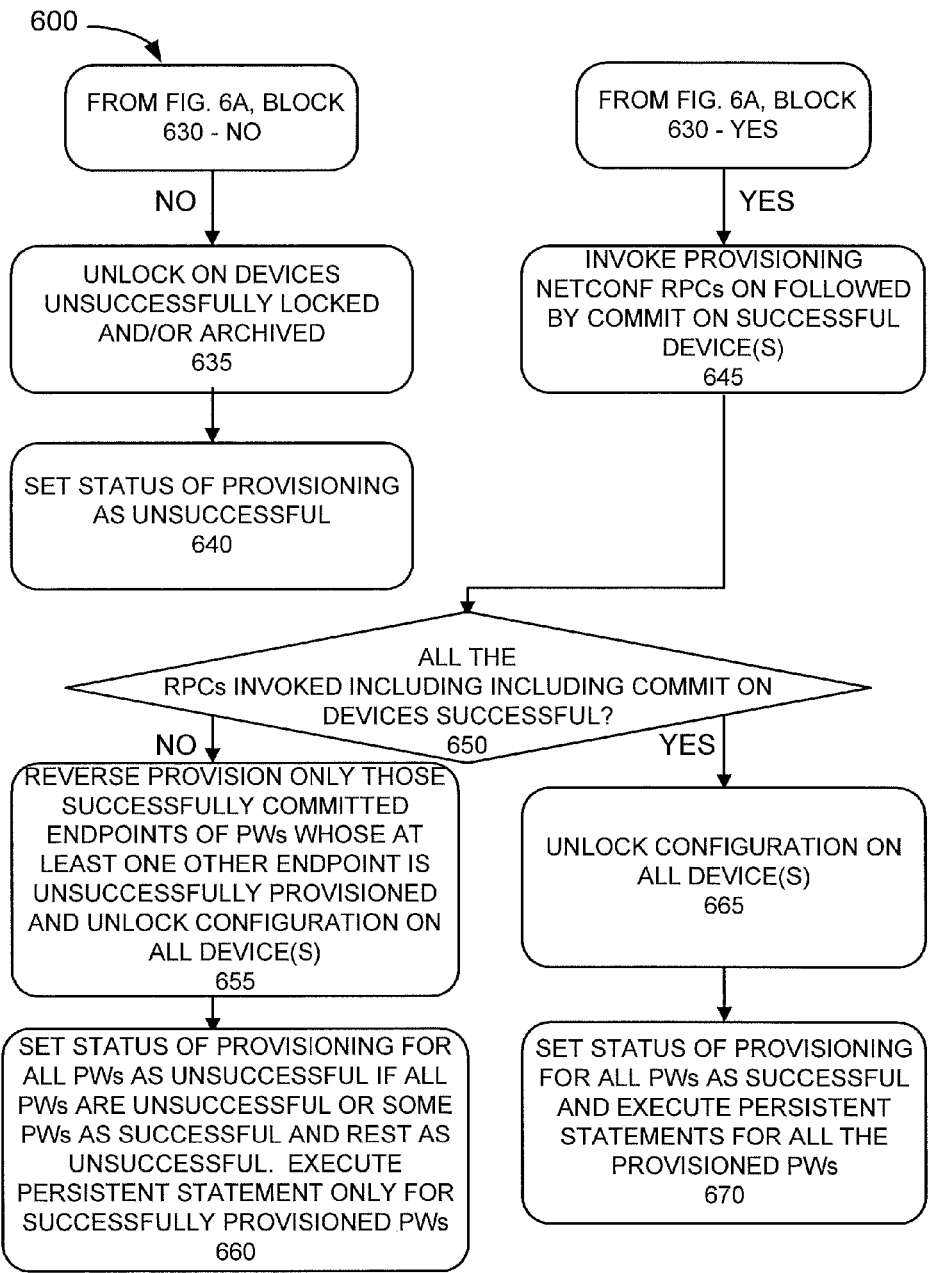

FIGS. 6A and 6B are flow diagrams illustrating an exemplary process 600 for configuration provisioning of network devices 135. In an implementation, process 600 may be performed by provisioning server 130. Process 600 may correspond to a partially atomic provisioning approach.

Process 600 may include receiving description file(s) (block 605). For example, provisioning engine 410 may receive configuration data 140 (e.g., XML description file 310) from provisioning client 110.

The description file(s) may be parsed (block 610). For example, provisioning engine 410 may parse configuration data 140 (e.g., XML description file 310) to select the appropriate provisioning template(s) from template database 420. As previously described, in an implementation, provisioning engine 410 may select the appropriate provisioning template(s) based on the PW operation type (e.g., add, edit, etc.), type of network device 135, and/or other types of provisioning parameters that may be specified in XML description file 310 or information associated with the PW to be provisioned.

RPC(s) may be generated (block 615). For example, provisioning engine 410 may generate NETCONF provisioning RPCs and NETCONF reverse provisioning RPCs for each network device (e.g. PWs) to be provisioned. Provisioning engine 410 may store the generated NETCONF RPCs in RPC storage 430.

Persistence statement(s) may be generated (block 620). For example, provisioning engine 410 may generate and store persistence statements in persistence statements storage 425. The persistence statement(s) may, when executed, indicate that network devices 135 have been successfully provisioned. Provisioning engine 410 or task manager 415 may execute persistence statement(s) when responses from NETCONF provisioning RPCs and the following COMMIT RPC commands are received from network devices 135 indicating that PW(s) have been successfully committed on all endpoints of the PW(s). Provisioning engine 410 or task manager 415 may execute persistence statement(s) when responses from COMMIT RPC commands are received from network devices 135 indicating that PW(s) have been successfully committed on all ends of the PW(s). Provisioning engine 410 may indicate to task manager 415 to provision network devices 135.

The configuration provisioning of device(s) may be scheduled (block 625). For example, task manager 415 may schedule a task to archive configuration data associated with network devices 135 to be provisioned. Additionally, task manager 415 may schedule a task to issue a LOCK command to network devices 135. Task manager 415 may attempt to LOCK and archive configuration data associated with network devices 135 to be provisioned.

It may be determined whether the archiving and locking of device(s) was successful (block 630). Task manager 415 may determine whether the archiving and locking of at least some network devices 135 was successful. For example, task manager 415 may determine whether a lock was successful based on a response from network device 135. Task manager 415 may then recognize whether some (e.g., one or more) network devices 135 were locked.

If the archiving and locking of at least some devices to be provisioned was not successful (block 630—NO), devices may be unlocked (block 635), as illustrated in FIG. 6B. For example, task manager 415 may schedule a task(s) to unlock successfully locked network devices 135 where configuration data was not archived. Task manager 415 may issue UNLOCK commands. In an implementation, when an UNLOCK command is unsuccessful, task manager 415 may be configured to make more than one attempt (e.g., x number of attempts).

Status of provisioning may be set as unsuccessful (block 640). For example, task manager 415 may set the task for provisioning as being unsuccessful and generate a report indicating that provisioning was unsuccessful for particular network devices 135. For example, task manager 415 may generate a report that indicates archiving or locking was unsuccessful with respect to network devices 135 that were unsuccessfully archived.

If the archiving and locking of at least some devices to be provisioned was successful (block 630—YES), NETCONF provisioning RPCs may be invoked to those devices followed by COMMIT on those devices (block 645), as illustrated in FIG. 6B. For example, task manager 415 may invoke the NETCONF provisioning RPCs on the successfully archived and locked network devices 135 followed by a single COMMIT RPC command to each network device 135. In general, for each network device 135, NETCONF provisioning RPCs may include a list of EDIT-CONFIG commands.

It may be determined whether the RPCs have been successfully provisioned (block 650). For example, task manager 415 may recognize whether the pushed NETCONF provisioning RPCs were successfully provisioned (including the COMMIT RPC commands) on at least some (e.g., one or more) of network devices 135 (e.g., based on responses from network devices 135).

Figure 7:
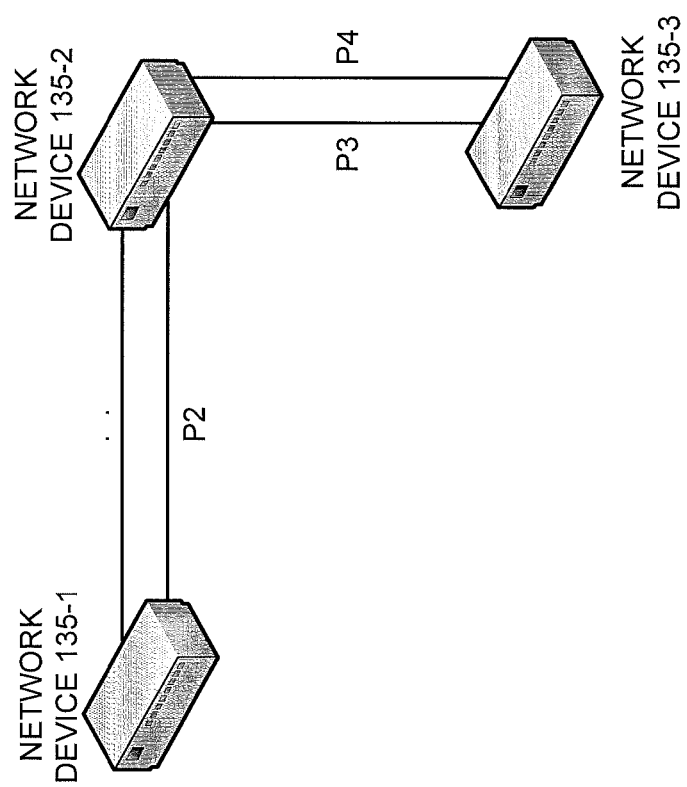
FIG. 7 is a diagram illustrating an exemplary device configuration scenario.

If it is determined that RPCs have not been successfully provisioned (block 650—NO), reverse provisioning RPCs may be used (block 655). For example, task manager 415 may schedule a task to reverse provision NETCONF RPCs successfully provisioned. That is, task manager 415 may schedule a task to reverse provision only those PWs in which all endpoints of the PWs were not successful. Task manager 415 may schedule a task to reverse provision successfully provisioned endpoints associated with those PWs. For example, one or more endpoints may be successfully RPC provisioned on network device(s) 135, but one or more other endpoints may be unsuccessfully RPC provisioned on other network devices 135. FIG. 7 is a diagram illustrating this concept.

Referring to FIG. 7, assume that there are network devices 135-1 through 135-3 and there are four PWs (P1, P2, P3, and P4) to be provisioned. In this example, the four PWs are point-to-point. However, in other instances, the PWs may be point-to-multipoint or multi-point-to-multi-point. Assume that NETCONF provisioning RPCs (including COMMIT RPC commands) for P1 and P2 are successfully RPC provisioned on network device 135-1. Further assume that NETCONF provisioning RPCs (including COMMIT RPC commands) for P1, P2, P3, and P4 are successfully provisioned on network device 135-2. Now assume that NETCONF provisioning RPCs for P3 and P4 are unsuccessfully provisioned on network device 135-3. With respect to network devices 135-1 and 135-2, P1 and P2 are successfully provisioned. However, network device 135-2 is unsuccessful with respect to P3 and P4 since network device 135-3 failed to successfully provision P3 and P4. That is, as previously stated, when one endpoint of a PW (e.g., at network device 135-2) may be successfully provisioned, but the other endpoint of the PW (e.g., at network device 135-3) may be unsuccessfully provisioned. Task manager 415 may schedule a task to reverse provision only P3 and P4 on network device 135-2. This is in contrast to what may be implemented according to a ROLLBACK command of the NETCONF protocol. That is, if task manager 415 were to issue a ROLLBACK command to network device 135-2, all of the PWs (P1, P2, P3, and P4) would be rolled back.

Referring back to FIG. 6B, task manager 415 may invoke appropriate NETCONF reverse provisioning RPCs on network devices 135 that were successfully RPC provisioned (block 655). Task manager 415 may push NETCONF reverse provisioning RPCs followed by COMMIT RPC commands to network devices 135 that were successfully provisioned for particular PWs, but other endpoint(s) for these particular PWs were not successfully provisioned. Task manager 415 may issue UNLOCK commands.

In an implementation, when an UNLOCK command, and/or a reverse provisioning attempt is/are unsuccessful, task manager 415 may be configured to make more than one attempt (e.g., x number of attempts). If task manager 415 is still unsuccessful after x number of attempts, task manager 415 may continue to block 660. It will be appreciated, however, since the configuration data associated with network devices 135 has been archived, network devices 135 (e.g., network device 135 in which NETCONF reverse provisioning RPCs are unsuccessful) may be restored to its previous configuration state (e.g., manually by user 105).

Status of all PWs may be set as unsuccessful if all the PWs are unsuccessfully provisioned or status of some PWs are unsuccessful and the rest of the PWs are successful depending on which of all the PWs have been successfully/unsuccessfully provisioned (block 660). For all the unsuccessfully provisioned PWs, task manager 415 may set the task for provisioning as being unsuccessful and generate a report indicating which of the all PWs were unsuccessfully provisioned. For all the successfully provisioned PWs, task manager 415 may execute the persistence statements and also may set the task as successful and generate a report indicating which of all the PWs are successfully provisioned.

If it is determined that RPCs (including the COMMIT RPC commands) have been successfully provisioned (block 650—YES), devices may be unlocked (block 665). Task manager 415 may issue an UNLOCK command, which releases a configuration lock provided by the LOCK command. In instances when UNLOCK commands are unsuccessful, task manager 415 may make x attempts to unlock network devices 135, when UNLOCK commands are unsuccessful. Additionally, task manager 415 may generate a report indicating that UNLOCK commands were unsuccessful.

Status of provisioning for all PWs may be set as successful and persistence statements for all the provisioned PWs may be executed (block 670). For example, task manager 415 may set the task for provisioning as being successful when UNLOCK commands are successful. Task manager 415 may execute the persistence statements for all PWs since all PWs have been successfully provisioned. Task manager 415 may generate a report that indicates provisioning of network devices 135 as successful.

Although FIGS. 6A and 6B illustrate exemplary process 600, in other implementations, process 600 may include additional, fewer, and/or different operations than those described and illustrated in FIGS. 6A and 6B. For example, in an implementation, when an UNLOCK command is unsuccessful, task manager 415 may be configured to make more than one attempt (e.g., x number of attempts). If task manager 415 is still unsuccessful after x attempts, task manager 415 may continue to block 670 and may generate a report which all network devices 135 cannot be unlocked.

Implementations described herein may include methods, devices, and/or systems that provide a scheme to provision configurations of network devices. In some cases, one or more network devices may not have rollback capability. Additionally, even when a network device may have rollback capability, implementations described herein may provide for the reverse provisioning of portions of configuration data (e.g., associated with PWs) that may not have been successfully updated while preserving other portions of configuration data (e.g., associated with other PWs) that may have been successfully updated.

Implementations described herein may also provide for the storing of NETCONF provisioning RPCs and NETCONF reverse provisioning RPCs so that the network device may be rolled back to any previous configuration state. Further, implementations described herein may provide for the combining of NETCONF RPCs so that the number of commits for each network device may be significantly reduced. For example, if multiple services may be updated based on a single commit to the network device than in a best case scenario, when there may be n network devices, there may be a maximum of n commits, and in a worse case scenario when reverse provisioning may be utilized due to error, there may be 2n commits.

Additionally, by combining the NETCONF provisioning RPCs required for each network device, a time required to provision configuration data may be considerably reduced, as each device configuration (e.g., PW) may be concurrently and independently provisioned. This may be true for any topology (e.g., point-to-point, full mesh, hub and spoke topologies, etc.). Further, granularity of tasks for device configuration provisioning may be maintained even though tasks for device configuration provisioning may be combined together when a network device commits. In this way, only PWs that have failed to be provisioned may be reverse provisioned. Additionally, implementations described herein may archive device configuration data. In this way, network devices that may be unreachable (e.g., unable to reverse provision, unlock, commit, etc.) may be returned to a state prior to the attempted provisioning. Also, templates having scripting capability provide a flexible framework for provisioning and reverse provisioning NETCONF RPCs.

CONCLUSION

The foregoing description of implementations provides an illustration, but is not intended to be exhaustive or to limit the implementations to the precise form disclosed. Modifications and variations are possible in light of the above teachings or may be acquired from practice of the teachings. For example, network device 125 (e.g., provisioning server 130) may include a northbound interface in which other applications may utilize the provisioning functionalities (e.g., as a web service) associated with network device 125. In this regard, for example, provisioning engine 410 may receive XML description files via the northbound interface. Additionally, while exemplary implementations have been described in relation to the provisioning of point-to-point PWs, in other implementations, provisioning of other types of PWs between devices (e.g., point-to-multi-point, multi-point-to-multi-point) that provide any type of network service may be utilized.

In addition, while series of blocks have been described with regard to the processes illustrated in FIGS. 5A-6B, the order of the blocks may be modified in other implementations. Further, non-dependent blocks may be performed in parallel.

Also, certain aspects have been described as being implemented as a "component" that performs one or more functions. This component may include hardware, such as a processor, microprocessor, an ASIC, or a FPGA, or a combination of hardware and software, such as a processor/microprocessor executing instructions stored on a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language (e.g., "single") is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
    providing, by one or more devices, a lock command to a particular network device;
    determining, by the one or more devices, that the particular network device was successfully locked based on the lock command;
    providing, by the one or more devices, one or more provisioning remote procedure calls (RPCs) after determining that the particular network device was successfully locked;
    determining, by the one or more devices, that a particular provisioning RPC, of the one or more provisioning RPCs, has not been successfully provisioned to the particular network device; and
    providing, by the one or more devices and after determining that the particular provisioning RPC has not been successfully provisioned to the particular network device, a particular reverse provisioning RPC to the particular network device,
        the particular reverse provisioning RPC being to reverse provision a particular pseudowire (PW) associated with the particular network device, and
        the particular reverse provisioning RPC including information for returning one or more portions of particular configuration data, of the particular network device and associated with the particular PW, to a prior state that existed prior to the providing of the one or more provisioning RPCs.

2. The method of claim 1, where determining that the particular provisioning RPC has not been successfully provisioned includes:
  determining that all endpoints of the particular PW have not being successfully configured.

3. The method of claim 1,
  where the one or more devices include a Network Configuration (NETCONF) protocol-enabled server device, and
  where the particular network device includes a NETCONF protocol-enabled network device.

4. The method of claim 1, further comprising:
  receiving data associated with the particular network device; and
  generating the one or more provisioning RPCs based on the data.

5. The method of claim 1, further comprising:
  providing a commit command to the particular network device; and
  determining that the commit command was successful before providing the particular reverse provisioning RPC to the particular network device.

6. The method of claim 1, further comprising:
  archiving, before providing the one or more provisioning RPCs, particular data associated with the particular network device;
  determining that the reverse provisioning of the particular PW is not successful after providing the particular reverse provisioning RPC to the particular network device; and
  using the particular data to return the one or more portions of the particular configuration data to the prior state after determining that the reverse provisioning of the particular PW is not successful.

7. The method of claim 4, where generating the one or more provisioning RPCs includes:
  selecting, based on the data, one or more provisioning templates that include scripting capability to provision the particular network device, and
  generating the one or more provisioning RPCs based on the one or more provisioning templates.

8. A device comprising:
  one or more processors to:
    provide a lock command to a network device,
    determine that the network device was successfully locked based on the lock command,
    provide one or more provisioning remote procedure calls (RPCs) after determining that the network device was successfully locked,
    determine that a provisioning RPC, of the one or more provisioning RPCs, has not been successfully provisioned to the network device, and
    provide, after determining that the provisioning RPC has not been successfully provisioned to the network device, a reverse provisioning RPC to the network device,
      the reverse provisioning RPC including information for returning configuration data, of the network device, to a prior state that existed prior to providing the one or more provisioning RPCs.

9. The device of claim 8, where the one or more processors are further to:
  provide a commit command to the network device, and
  determine that the commit command was successful before providing the reverse provisioning RPC to the network device.

10. The device of claim 8,
  where the reverse provisioning RPC is to reverse provision a pseudowire (PW) associated with the network device, and
  where the configuration data is associated with the PW.

11. The device of claim 8,
  where the device includes a Network Configuration (NETCONF) protocol-enabled server device, and
  where the network device includes a NETCONF protocol-enabled network device that does not have rollback capability.

12. The device of claim 8, where the one or more processors are further to:
  receive data associated with the network device, and
  generate the one or more provisioning RPCs based on the data.

13. The device of claim 8, where the one or more processors are further to:
  determine that reverse provisioning based on the reverse provisioning RPC is not successful after providing the reverse provisioning RPC to the network device, and
  use archived data to return the configuration data to the prior state after determining that the reverse provisioning is not successful.

14. A non-transitory computer-readable medium storing instructions, the instructions comprising:
  one or more instructions that, when executed by at least one processor, cause the at least one processor to:
    provide a lock command to a network device,
    determine that the network device was successfully locked based on the lock command,
    provide a provisioning remote procedure call (RPC) after determining that the network device was successfully locked,
    determine that the provisioning RPC has not been successfully provisioned to the network device, and
    provide, after determining that the provisioning RPC has not been successfully provisioned to the network device, a reverse provisioning RPC to the network device,
      the reverse provisioning RPC including information for returning configuration data, of the network device, to a prior state that existed prior to providing the provisioning RPC.

15. The non-transitory computer-readable medium of claim 14, where the one or more instructions to determine that that the provisioning RPC has not been successfully provisioned include:
  one or more instructions that, when executed by the at least one processor, cause the at least one processor to:
    determine that an endpoint of a pseudowire (PW), associated with the network device, has not been successfully configured, and
    determine that that the provisioning RPC has not been successfully provisioned based on the endpoint of the pseudowire (PW) not being successfully configured.

16. The non-transitory computer-readable medium of claim 14,
  where the network device includes a Network Configuration (NETCONF) protocol-enabled network device, and
  where the provisioning RPC includes a Network Configuration (NETCONF) protocol RPC.

17. The non-transitory computer-readable medium of claim 14, where the instructions further comprise:
    one or more instructions that, when executed by the at least one processor, cause the at least one processor to:
        receive data associated with the network device, and
        generate the provisioning RPC based on the data.

18. The non-transitory computer-readable medium of claim 14, where the instructions further comprise:
    one or more instructions that, when executed by the at least one processor, cause the at least one processor to:
        select a provisioning template that include scripting capability to provision the network device, and
        generate the provisioning RPC based on the provisioning template.

19. The non-transitory computer-readable medium of claim 14, where the one or more instructions to provide the reverse provisioning RPC to the network device comprise:
    one or more instructions that, when executed by the at least one processor, cause the at least one processor to:
        provide a commit command to the particular network device after determining that the provisioning RPC has not been successfully provisioned to the network device,
        determine that the commit command was successful, and
        provide the reverse provisioning RPC to the network device after determining that the commit command was successful.

20. The non-transitory computer-readable medium of claim 14,
    where the reverse provisioning RPC is to reverse provision a pseudowire (PW) associated with the network device, and
    where the configuration data is associated with the PW.

\* \* \* \* \*